(12) United States Patent
Amato

(10) Patent No.: US 7,518,080 B2
(45) Date of Patent: Apr. 14, 2009

(54) JUST-IN-TIME SORT PLAN CREATION

(75) Inventor: Michael J. Amato, Reston, VA (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 10/450,465

(22) PCT Filed: Dec. 17, 2001

(86) PCT No.: PCT/US01/47717

§ 371 (c)(1),
(2), (4) Date: Jun. 13, 2003

(87) PCT Pub. No.: WO02/48946

PCT Pub. Date: Jun. 20, 2002

(65) Prior Publication Data

US 2004/0030661 A1 Feb. 12, 2004

Related U.S. Application Data

(60) Provisional application No. 60/255,431, filed on Dec. 15, 2000.

(51) Int. Cl.
*B07C 5/00* (2006.01)
(52) U.S. Cl. .................................. 209/584; 209/900
(58) Field of Classification Search ................ 209/900, 209/584; 700/219–221, 223–226
See application file for complete search history.

(56) References Cited

U.S. PATENT DOCUMENTS

| 4,743,747 A | 5/1988 | Fougere et al. |
| 4,871,903 A | 10/1989 | Carrell |
| 5,005,124 A | 4/1991 | Connell et al. |
| 5,009,321 A | 4/1991 | Keough |
| 5,031,223 A * | 7/1991 | Rosenbaum et al. ........ 382/101 |
| 5,042,667 A | 8/1991 | Keough |
| 5,249,687 A | 10/1993 | Rosenbaum et al. |
| 5,277,321 A * | 1/1994 | Nagasawa et al. ........... 209/583 |
| 5,291,002 A | 3/1994 | Agnew et al. |
| 5,311,597 A | 5/1994 | Rosenbaum |
| 5,329,102 A | 7/1994 | Sansone |

(Continued)

FOREIGN PATENT DOCUMENTS

EP 586883 A2 * 3/1994

(Continued)

OTHER PUBLICATIONS

International Search Report in PCT/US02/08650, mailed Jul. 12, 2002.

(Continued)

*Primary Examiner*—Patrick H Mackey
*Assistant Examiner*—Mark Hageman
(74) *Attorney, Agent, or Firm*—Finnegan, Henderson, Farabow, Garrett & Dunner, LLP

(57) ABSTRACT

Systems and methods are disclosed for creating a delivery sequence sort plan for automated sorting of mailpieces to a carrier sequence sorter. The delivery sequence sort plan is generated based on information about an incoming mail batch, such that the sort plan is created just prior to the delivery sequence processing of the incoming mail batch.

20 Claims, 4 Drawing Sheets

U.S. PATENT DOCUMENTS

| | | | |
|---|---|---|---|
| 5,363,971 A | 11/1994 | Weeks et al. | |
| 5,420,403 A | 5/1995 | Allum et al. | |
| 5,514,863 A | 5/1996 | Williams | |
| 5,667,078 A | 9/1997 | Walach | |
| 5,901,855 A * | 5/1999 | Uno et al. | 209/584 |
| 5,924,576 A * | 7/1999 | Steenge | 209/584 |
| 6,135,292 A * | 10/2000 | Pettner | 209/603 |
| 6,241,099 B1 * | 6/2001 | Hendrickson et al. | 209/542 |
| 6,443,311 B2 * | 9/2002 | Hendrickson et al. | 209/542 |
| 6,576,857 B1 * | 6/2003 | De Leo et al. | 209/584 |
| 6,598,748 B2 * | 7/2003 | Mileaf et al. | 209/542 |
| 6,685,030 B1 * | 2/2004 | Mileaf | 209/542 |
| 6,741,908 B2 * | 5/2004 | Vanderbles et al. | 700/224 |
| 6,762,384 B1 * | 7/2004 | Kechel | 209/584 |

FOREIGN PATENT DOCUMENTS

| | | |
|---|---|---|
| EP | 1 086 754 A2 | 3/2001 |
| WO | WO 99/07487 | 2/1999 |
| WO | WO 02/077874 A1 | 10/2002 |

OTHER PUBLICATIONS

International Search Report in PCT US01/47717, mailed Jan. 16, 2004.

* cited by examiner

JUST-IN-TIME SORT PLAN CREATION

CROSS REFERENCE TO RELATED APPLICATION

This application claims priority on U.S. Provisional Application Ser. No. 60/255,431, filed Dec. 15, 2000, by Michael J. Amato and titled JUST-IN-TIME SORT PLAN CREATION, the entire disclosure of which is expressly incorporated herein by reference.

DESCRIPTION

1. Technical Field

This invention relates to automated sorting of delivery items for delivery to recipients, and more specifically to a data processing system for creating a delivery sequence sort plan ("sort plan") for sorting of the delivery items.

2. Background

Delivery point sequencing ("DPS") of the delivery items means arranging items in the order in which a delivery carrier traverses his route, for example, from house or building A, to B, to C, to D. This sequencing is conventionally done using sort plans. For example, as is well known in the art, a sort plan for mailpieces correlates a geographic code, such as a ZIP Code to a container known as a "pocket". The ZIP Code may be in any numeric format, and in the United States it is typically in a 5-digit format, a 9-digit format, or a zip-plus-four-plus-two (11-digit) format. A pocket may be an output bin that a sorting machine places mailpieces into as they are sequenced.

A sort plan controls the operation of a sorting machine. Typically, sorting machines sort mail by ZIP Code or by barcode corresponding to the ZIP Code. A sort plan specifies for a sorting machine a desired sequence order for sorting mailpieces to a set of pockets. The sequence order may be determined by carrier routes. Currently, sort plans are built on the assumption that every house or delivery point will receive at least one mailpiece every day, which causes the sort plans to be very large. A conventional sort plan is disclosed in U.S. Pat. No. 5,363,971 by Horace W. Weeks et al. and titled Automatic Carrier Sequence Bar Code Sorter, the disdosure of which is incorporated herein by reference.

Typically, a mail processing facility receives mail from three primary sources: bulk mail companies, a United States Postal Service ("USPS") Processing and Distribution Center ("P&DC"), or a local collection unit, for example, the mailboxes in a town. All the incoming mail, from whatever source, that will be processed for the current delivery cycle is called the mail batch.

The specific contents of a mail batch that is about to be sorted to a carrier sequence level is known because that information is gathered from one or more previous sorts that occurred in an upstream operation before the carrier sequence sort. A carrier sequence sort is typically the final sort, wherein the contents of a mail batch are sorted to pockets for delivery by individual mail carriers. In an upstream operation, optical character readers ("OCRs") may scan incoming pieces of mail for delivery address information and the upstream operation may generate barcodes for the incoming pieces of mail based on the scanned information. The barcodes may include information that corresponds to ZIP Codes, and may identify a carrier's delivery stops along his mail route. Thus, the upstream operation may assemble information on the specific contents of the mail batch. That information is available from the upstream machines as a mail batch comes into a plant for final sorting into the carrier delivery sequence.

For example, consider a batch of mail coming from a Baltimore, Md. P&DC into a Reston, Va. P&DC. The Baltimore P&DC has acquired information about mail sorted therein and sent to the Northern Virginia P&DC. This information includes a listing of all ZIP Codes on mail contained in the batch and may be available two to three hours before processing of the batch begins at a P&DC. For example, the batch may include mail for the towns of Reston, Va., Manassas, Va., and Chantilly, Va. There are specific carriers with routes covering each of those towns.

When conventional sort plans sort the mail, they assume that each carrier is going to receive mail on every day for every house or delivery point, so a sort pocket is assigned to every house and delivery point. For example, if five carriers in a town each service 10 houses per carrier, then conventional sort plans require 50 pockets on automatic sorting equipment to be permanently assigned. That is, all 50 pockets are reserved even if no mail from the incoming batch is destined for one or more of these houses. Thus, conventional sort plans are rigid, statically reserving pockets for delivery points, regardless of the actual current mail stream.

Furthermore, conventional sort plans are currently predefined and they never change due to operating conditions. They may, however, be changed offline, for example, to add a newly built house or to accommodate predefined mail-hold days. In addition, different sort plans may be used on a daily basis simply because certain delivery points do not want mail delivery every day. For example, a business may be closed on Saturday and Sunday, so it may not want mail delivered on those two days. Accordingly, a different sort plan may be run on Saturdays and Sundays to eliminate that business as a delivery point. Similarly, a customer may stop delivery to his home for a week because he is on vacation, which may be reflected in that week's sort plans. Nonetheless, such daily sort plans are static with respect to the actual contents of the current mail batch. They are built in advance, before the mail is sorted on those days.

Some conventional systems, such as certain carrier route bar codes sorters supplied by Siemen AG, can adjust a sort plan based on zero volume for a particular house or delivery point. For example, if a business delivery point receives no mail on Saturdays, the sort plan is adjusted to automatically throw out that delivery point.

Systems and methods for processing and distributing mail in a conventional manner are described in European Patent Application EP 1 086 745 A2, filed on Sept. 25, 2000 by Siemens ElectroCom L.L.P. and titled Mail Item Distribution Method and Device. Methods for sorting mail items using a pre-sort plan are described in PCT Application WO 99/07487 and titled Method for Sorting Mail Items.

Accordingly, there is a need for systems and methods for creating a dynamic sort plan, based on the content of the current incoming mail stream, revised as necessary, each time a batch of mail is sequenced instead of merely adjusting an existing sort plan. The sort plan should be created just in time, immediately before processing of the mail, to alleviate the disadvantages of conventional sort plans.

This is achieved by providing for the creation of a sort plan based upon delivery information from delivery items in the batch being input to the sorting process for the incoming delivery stream, thereby further automating and optimizing the processing of the incoming delivery batch.

SUMMARY OF THE INVENTION

In accordance with one aspect of the present invention, systems and methods are disclosed for creating a delivery sequence sort plan for sorting items for delivery where each item has a geographic code identifying the location of delivery. Such systems and methods collect the geographic code associated with each item; compute a number of items associated with each geographic code; access a desired delivery sequence associated with each geographic code; and generate the delivery sequence sort plan based on the desired delivery sequence and the number of items associated with each geographic code.

In accordance with another aspect of the present invention, systems and methods are disclosed for creating a delivery sequence sort plan for sorting items for delivery where each item has a geographic code identifying the location of delivery. Such systems and methods receive information for sorting the items, the information including the geographic code associated with each item and a numeric value indicating a number of items associated with each geographic code; access a desired delivery sequence associated with each geographic code; and generate the delivery sequence sort plan based on the desired delivery sequence and the number of items associated with each geographic code.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION

Reference will now be made in detail to the exemplary embodiments of the invention, an example of which is illustrated in the accompanying drawings. Wherever possible, the same reference numbers will be used throughout the drawings to refer to the same or like parts.

Figure 1:
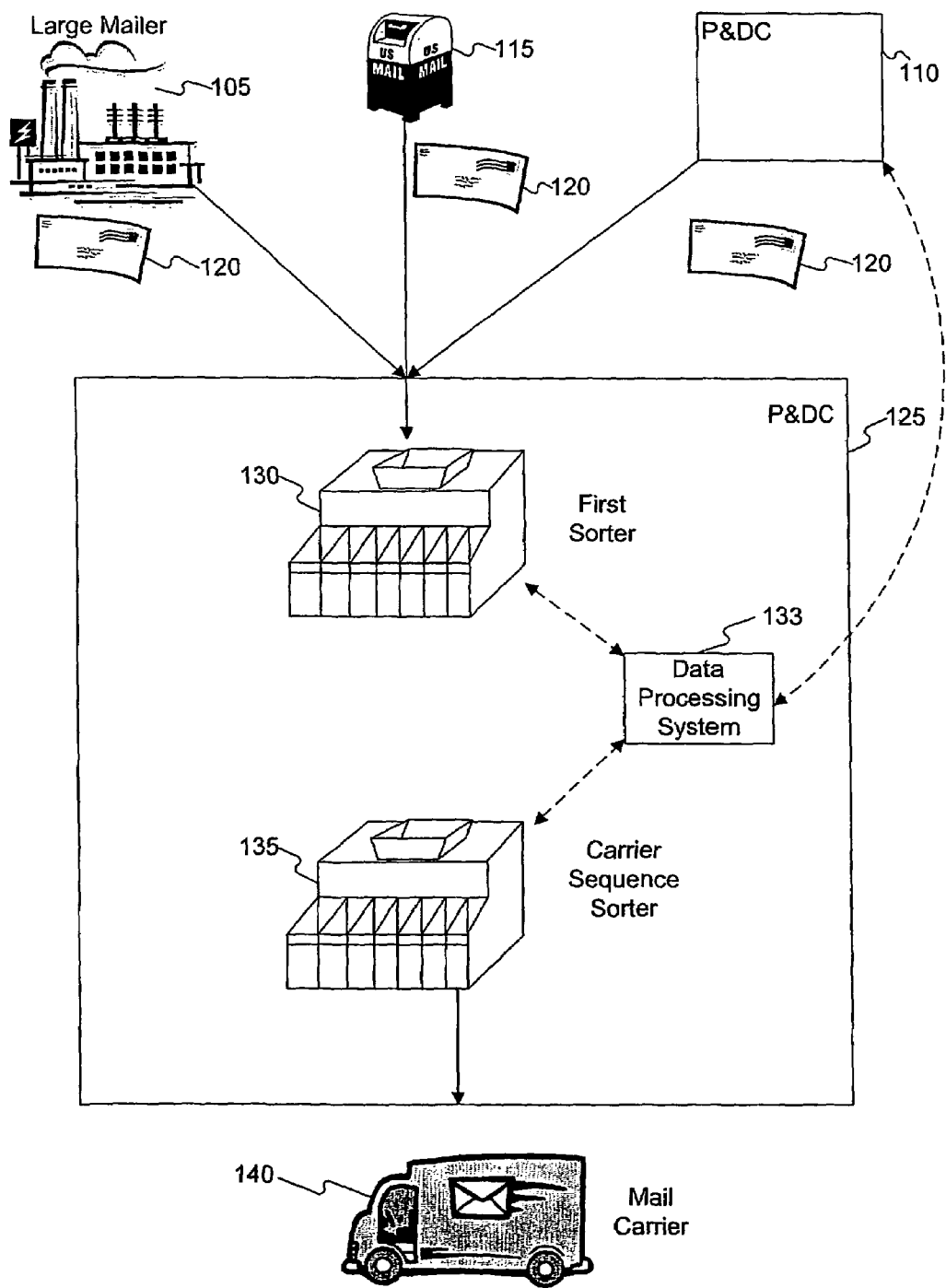
FIG. 1 is a schematic illustration of a mail processing and distribution system consistent with the present invention.

In accordance with an example of the present invention, and as shown in FIG. 1, a Processing and Distribution Center ("P&DC") 125 may receive delivery items such as mail 120, from three sources, a bulk mailer 105, another P&DC 110, and local mail collection unit 115. The mail from these three sources may make up the current mail batch. P&DC 125 may perform an incoming operation on the received mail, such as sorting it into delivery regions with a first sorter 130. In one embodiment, first sorter 130 records all the ZIP Codes and the number of pieces of mail for each ZIP Code for all the incoming mail in the batch, which may be delivered during the current delivery cycle. The recorded information is sent to a data processing system 133. In addition, first sorter 130 may sort the incoming mail to the 5 digit level, stacking the mail into slots for each of the 5-digit ZIP Code geographical regions.

When mail has previously been processed by another facility, such as P&DC 110, prior to the mail being sent to P&DC 125 for delivery, the information collected on individual mailpieces by P&DC 110 may be transmitted to data processing system 133 for use in creating a sort plan at P&DC 125. The USPS's identification code sort ("CS") system is an example of a system that collects such information and makes it available to P&DCs.

In an ICS system, an identification code is applied to the back of a mailpiece and a postal barcode is applied to the front of the mailpiece in accordance with the destination information on the mailpiece. The postal barcode may correspond to a ZIP Code and is used in sorting and tracking mail. The identification code is an alternative means for uniquely identifying the mailpiece. The ICS system creates an identification file corresponding to the identification code and includes the postal barcode. The identification file may be accessed by a P&DC.

Data processing system 133 may include a Sort Program System ("SPS") database, which lists the desired delivery sequence for the delivery points on a mail carrier's route. The SPS database lists, for example, all the houses on Main Street, in the order that a carrier delivers to them. Consider a situation in which the information from the current mail batch as derived from P&DC 110 and first sorter 130 shows that there is mail for only fifteen of the twenty houses on Main Street. Data processing system 133 may combine this information with the SPS database sequence to create a sort plan tailored for the individual incoming mail batch that arranges the mail for those fifteen houses into the proper delivery sequence, without allocating pockets in carrier sequence sorter 135 or other sort resources to the five addresses not receiving mail that day.

As is known in the art, the SPS delivery sequence, or batch, is different almost every day. For example, on a given Saturday a batch may not include hold out mail addresses, such as for businesses that do not want their mail delivered on Saturdays. The previous day's sequence, in contrast, would include a delivery stop at the business addresses.

Data processing system 133 produces the sort plan for carrier sequence sorter 135, which puts the mail into a final delivery point sequence ("DPS"). As discussed above, the sort plan optimizes the use of carrier sequence sorter 135, so that a minimum number of pockets are used to sort the mail in the current mail batch. After the mail items are sorted into sequence, a mail carrier 140 delivers the mail items in the mail batch to the addresses on his delivery route.

Figure 2:
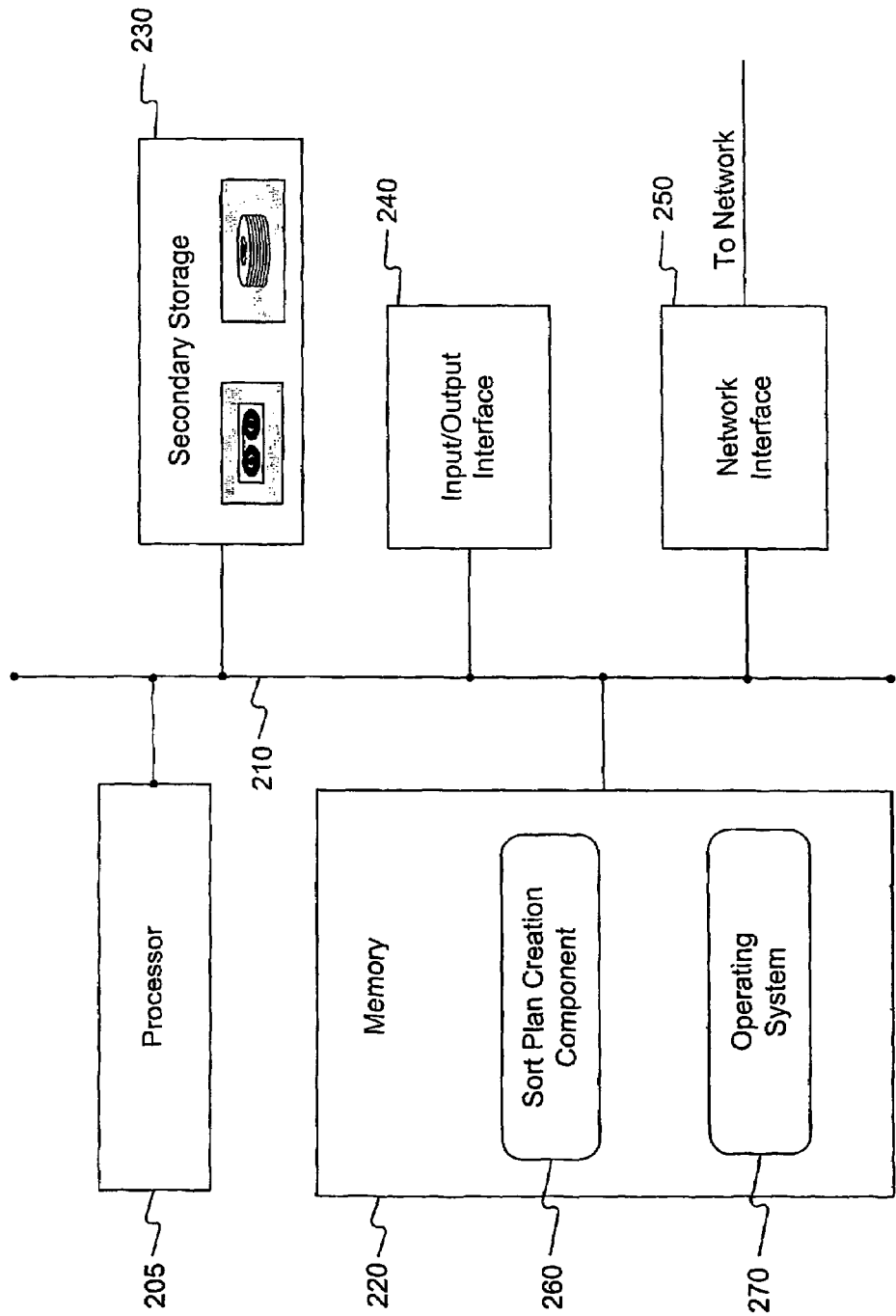
FIG. 2 is a block diagram of a data processing system consistent with the present invention.

FIG. 2 is a block diagram of a data processing system 133 consistent with the present invention. Data processing system 133 may be implemented using any appropriate type of computer, such as a personal computer, a workstation, a minicomputer, a mainframe computer, a hand-held device, etc.

Data processing system 133 may include a processor 205, a bus 210, a memory 220, a secondary storage 230, an input/output interface component 240, and a network interface component 250. Processor 205 may be any commercially available processor capable of executing program instructions, such as a Pentium microprocessor from Intel Corporation, a SPARC processor, a Power PC microprocessor, or a PA_RISC processor. Bus 210 facilitates communication of data and other information among components of data processing system 133.

Memory 220 may include a sort plan creation component 260 for creating a sort plan based on information about an incoming mail batch, and an operating system 270 for generally controlling and coordinating operation of data processing system 133. Sort plan creation component 260 may also be stored on secondary storage 230 and loaded into memory 220 to provide instructions for creating a sort plan. Sort plan creation component 260 may be implemented in any appropriate computer programming language, scripting tool, or other software tool, such as C++, C, Java, Hypertext Markup Language ("HTML"), Visual Basic, etc. Operating system 270 controls allocation of system resources. It performs tasks, such as memory management, process scheduling, networking, and services, among other things. Memory 220 may be configured using random access memory ("RAM") alone or in combination with other types of memory.

Secondary storage 230 may be configured using any computer-readable medium, such as a hard disk drive, a compact disc ("CD") drive, and/or a read/write CD drive. From secondary storage 230, software and data may be loaded into memory 220. Similarly, software and data in memory 220 may be stored on secondary storage 230. In addition, secondary storage 230 may include a Sort Program System ("sPS") database for storing delivery sequences for the delivery points on mail carrier routes.

Input/Output interface component 240 may include one or more of a keyboard, a pointing device, a voice recognition device, a keypad, display unit, or a printing device. Network interface module 250 may include hardware and software for sending and receiving data over a network, and may be used, for example, to send or receive information with a P&DC 110.

Figure 3:
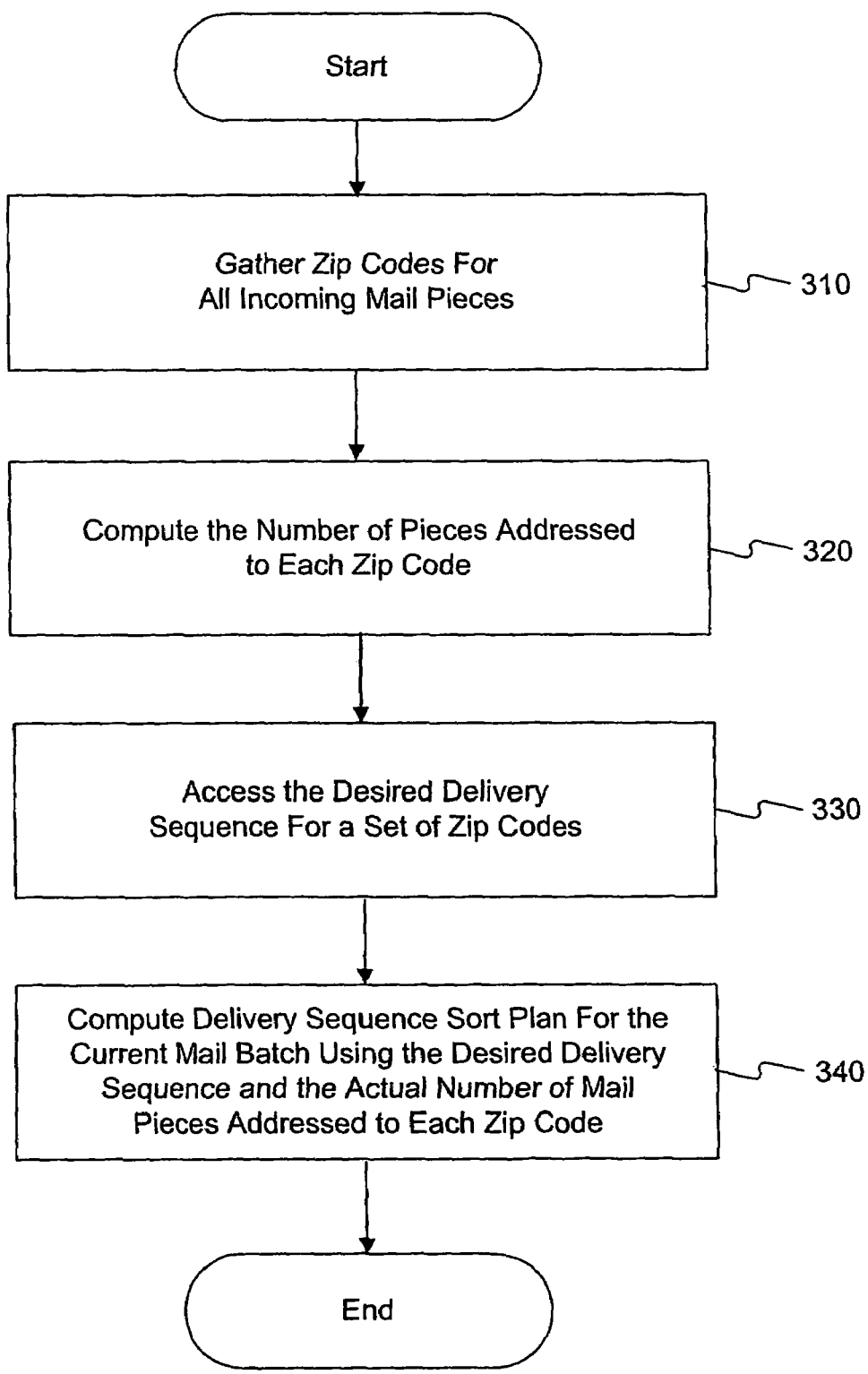
FIG. 3 is a flowchart showing a method for creating a delivery sequence sort plan consistent with the present invention.

FIG. 3 is a flowchart showing a method for creating a delivery sequence sort plan consistent with the present invention. In one example of a first sort process, and as shown in FIG. 3, ZIP Codes are gathered for all incoming mailpieces, for example from a bulk mailer 105, another P&DC 110, or local mail collection 115 (stage 310). To gather the ZIP Codes, first sorter 130 may include an OCR that scans incoming pieces of mail for address information and may generate barcodes for the incoming pieces of mail based on the scanned information.

First sorter 130 may compute the number of pieces of mail addressed to each ZIP Code (stage 320). Further, first sorter 130 may record all the ZIP Codes and the number of pieces for each ZIP Code for all the incoming mail in the batch, which will be delivered during the current delivery cycle, and may store the recorded information on secondary storage 230. First sorter 130 sorts the incoming mail to the 5 digit level, stacking the mail into slots for each of the 5-digit ZIP Code geographical regions. In addition, first sorter 130 may send the recorded information to a data processing system 133.

Sort plan creation component 260 may receive the recorded information from first sorter 130. Then, sort plan creation component 260 may query a SPS database to access the desired delivery sequence for a particular set of ZIP Codes specified in the recorded information (stage 330). Finally, based on the desired delivery sequence and the actual number of mailpieces addressed to each ZIP Code both from P&DC 110 and first sorter 130, sort plan creation component 260 may generate a delivery sequence sort plan for the current batch of mail to be sorted by carrier sequence sorter 135 (stage 340).

In another example, ZIP Codes are gathered by P&DC 110 for all incoming mailpieces (stage 310). P&DC 110 may compute the number of pieces of mail addressed to each ZIP Code (stage 320). Further, P&DC 110 may record all the ZIP Codes and the number of pieces for each ZIP Code for all the incoming mail in the batch, which will be delivered during the current delivery cycle. P&DC 110 may send the recorded information to data processing system 133 at P&DC 125, prior to the mail being sent to P&DC 125 for delivery. The recorded information may be sent from P&DC 110 to P&DC 125 over a network.

Sort plan creation component 260 may receive the recorded information from P&DC 110. Thereafter, sort plan creation component 260 may query a SPS database to access the desired delivery sequence for a particular set of ZIP Codes specified in the recorded information (stage 330). Finally, based on the desired delivery sequence and the actual number of mailpieces addressed to each ZIP Code, sort plan creation component 260 may generate a delivery sequence sort plan for the current batch of mail to be sorted by carrier sequence sorter 135 (stage 340).

Figure 4:
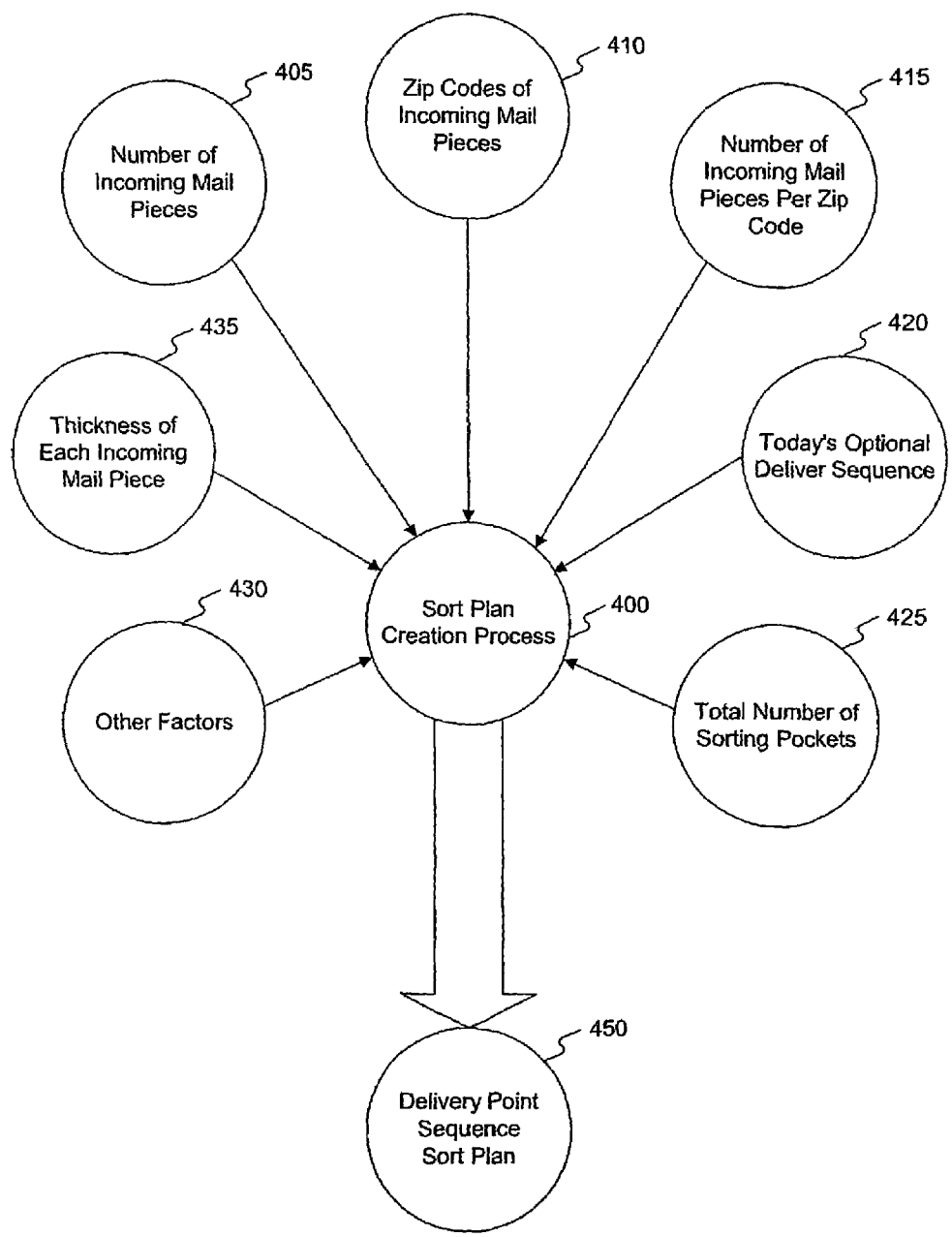
FIG. 4 is a diagram of factors that may be taken into account when creating a delivery sequence sort plan consistent with the present invention.

FIG. 4 is a diagram of factors that may be taken into account when creating a delivery sequence sort plan consistent with the present invention. The process for creation of a sort plan 400 is mathematical, and may take into account a variety of factors, as shown in FIG. 4. At creation of a sort plan, data processing system 133 takes into account the number of incoming mailpieces 405, ZIP Codes of incoming mailpieces 410, and the number of incoming mailpieces per ZIP Code 415. In addition, data processing system 133 may take into account an optional delivery sequence 420, such as businesses who do not receive mail on Saturday.

Data processing system 133 may also take into account the total number of sorting pockets available 425, as the number of pockets may vary by machine. A number of additional factors 430 that may affect the sorting of the mail could also be considered, such as the average thickness of the mailpieces 435, so that no one pocket is physically overloaded. An average number may be used for mailpiece thickness, or actual thickness information gathered during an upstream operation may be used.

For example, the USPS Carrier Sequence Bar Code Sorter ("CSBCS"), which is a machine that is remotely located in Post Offices, uses a weighting factor to calculate an average thickness value when it sorts mixed first class mail and standard mail and/or when it is used to sort purely standard mail. For example, first class mail might be an average of one-tenth of an inch thick and standard mail may be one-quarter of an inch thick. When those two classes are mixed, the average thickness is weighted to calculate a new average used for processing. For example, the weighting may be two first-class pieces for every standard piece. Based on this, a calculation is made to determine how much mail will fit into a pocket. Another method is to use a piece of equipment that actually measures the thickness of the mail that goes to the machine and store that information, which is later used in creating a sort plan.

These factors may be considered while creating a delivery point sequence sort plan 450 based on the actual mail to be sorted, rather than based on a static plan. Thus, the efficiency and/or the speed of sorting the mail and getting the mail to a carrier for delivery is optimized.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for sorting items for delivery where each item has a geographic code identifying the location of delivery, the method comprising:

receiving items for delivery to a delivery point, the items being received at a receiving location;

collecting geographic codes associated with the items;

computing a number of items associated with one or more geographic codes;

accessing a desired delivery sequence for delivery points on a route, the desired delivery sequence being associated with the one or more geographic codes;

identifying at least one delivery point on the route which did not receive an item for delivery;

generating a delivery sequence sort plan based on the desired delivery sequence and the number of items associated with the one or more geographic codes; and sorting the items according to the delivery sequence sort plan, wherein the delivery sequence sort plan does not allocate a sort resource for the delivery points on the route which did not receive an item for delivery at the receiving location.

2. The method of claim 1, wherein the geographic code includes a ZIP Code.

3. The method of claim 1, wherein generating the delivery sequence sort plan comprises:

creating a set of geographic codes based on the collected geographic code associated with each item and the computed number of items associated with each geographic code;

removing from the set of geographic codes any geographic code scheduled for non-delivery based on the desired delivery sequence;

allocating an optimum number of pockets for sorting the items into a delivery sequence based on the set of geographic codes; and creating the delivery sequence sort plan based on the pocket allocation.

4. The method of claim 1, wherein generating the delivery sequence sort plan further comprises generating the delivery sequence sort plan based on mail delivery factors.

5. The method of claim 4, wherein the mail delivery factors include at least one of the following: an optional delivery sequence, an available number of sorting pockets for a sorting machine, and an average thickness of a piece of mail.

6. A system for sorting items for delivery where each item has a geographic code identifying the location of delivery, the system comprising:

means for collecting geographic codes associated with the items for delivery to a delivery point, the items being received at a receiving location;

means for computing a number of items associated with one or more geographic codes;

means for assessing a desired delivery sequence for delivery points on a route, the desired delivery sequence being associated with the one or more geographic codes; and means for identifying at least one delivery point on the route which did not receive an item for delivery;

means for generating a delivery sequence sort plan based on the desired delivery sequence and the number of items associated with the one or more geographic codes; and means for sorting the items according to the delivery sequence sort plan, wherein the means for generating the delivery sequence sort plan does not allocate a sort resource for the delivery points on the route which did not receive an item for delivery at the receiving location.

7. The system of claim 6, wherein the means for generating the deliver sequence sort plan comprises:

means for creating a set of geographic codes based on the collected geographic code associated with each item and the computed number of items associated with each geographic code;

means for removing from the set of geographic codes any geographic code scheduled for non-delivery based on the desired delivery sequence;

means for allocating an optimum number of pockets for sorting the items into a delivery sequence based on the set of geographic codes; and means for creating the delivery sequence sort plan based on the pocket allocation.

8. A method for sorting items for delivery, the method comprising:

receiving information for sorting items for delivery to a delivery point at a receiving location, the information including a geographic code associated with each item and a numeric value indicating a number of items associated with each geographic code;

accessing a desired delivery sequence for delivery points on a route, the desired delivery sequence being associated with each geographic code;

identifying at least one delivery point on the route which did not receive an item for delivery;

generating a delivery sequence sort plan based on the desired delivery sequence and the number of items associated with each geographic code; and sorting the items according to the delivery sequence sort plan, wherein the delivery sequence sort plan does not allocate a sort resource for the delivery points on the route which did not receive an item for delivery at the receiving location.

9. The method of claim 8, wherein a geographic code includes a ZIP Code.

10. The method of claim 8, wherein generating the delivery sequence sort plan comprises:

creating a set of geographic codes based on the geographic code associated with each item and the number of items associated with each geographic code;

removing from the set of geographic codes any geographic code scheduled for non-delivery based on the desired delivery sequence;

allocating an optimum number of pockets for sorting the pieces of mail into a delivery sequence based on the set of geographic codes; and creating the delivery sequence sort plan based on the pocket allocation.

11. The method of claim 8, wherein generating the delivery sequence sort plan further comprises generating the delivery sequence sort plan based on mail delivery factors.

12. The method of claim 11, wherein the mail delivery factors include at least one of the following: an optional delivery sequence, an available number of sorting pockets for a sorting machine, and an average thickness of a piece of mail.

13. A system for sorting items for delivery, the system comprising:

means for receiving information for sorting items received at a receiving location, the information including a geographic code associated with each item and a numeric value indicating a number of items associated with each geographic code;

means for accessing a desired delivery sequence for delivery points on a route, the desired delivery sequence being associated with each geographic code;

means for identifying at least one delivery point on the route which did not receive an item for delivery;

means for generating a delivery sequence sort plan based on the desired delivery sequence and the number of items associated with each geographic codes; and means for sorting the items according to the delivery sequence sort plan, wherein the delivery sequence sort plan does not allocate a sort resource for the delivery points on the route which did not receive an item for delivery at the receiving location.

14. The system of claim 13, wherein the means for generating the delivery sequence sort plan comprises:
    means for creating a set of geographic codes based on the geographic code associated with each item and the number of items associated with each geographic code;
    means for removing from the set of geographic codes any geographic code scheduled for non-delivery based on the desired delivery sequence;
    means for allocating an optimum number of pockets for sorting the items into a delivery sequence based on the set of geographic codes; and
    means for creating the delivery sequence sort plan based on the pocket allocation.

15. A system for sorting items for delivery, the system comprising:
    a processor; and
    a memory unit in communication with the processor and storing a program component, wherein the processor is operative with the program component to:
        receive information for sorting items received at a receiving location, the information including a geographic code associated with each item and a numeric value indicating a number of items associated with each geographic code;
        access a desired delivery sequence for delivery points on a route, the desired delivery sequence being associated with each geographic code;
        identify at least one delivery point on the route which did not receive an item for delivery; and
        generate a delivery sequence sort plan based on the desired delivery sequence and the number of items associated with each geographic codes,
        wherein the delivery sequence sort plan does not allocate a sort resource for the delivery points on the route which did not receive an item for delivery at the receiving location.

16. A computer readable medium containing computer executable instructions for creating a delivery sequence sort plan for sorting items for delivery embedded therein which when executed by a computer, cause the computer to perform the steps of:
    receiving information for sorting items received at a receiving location, the information including a geographic code associated with each item and a numeric value indicating a number of items associated with each geographic code;
    accessing a desired delivery sequence for delivery points on a route, the desired delivery sequence being associated with each geographic code;
    identifying at least one delivery point on the route which did not receive an item for delivery; and
    generating a delivery sequence sort plan based on the desired delivery sequence and the number of items associated with each geographic codes,
    wherein the delivery sequence sort plan does not allocate a sort resource for the delivery points on the route which did not receive an item for delivery at the receiving location.

17. The computer readable medium of claim 16, wherein generating the delivery sequence sort plan comprises:
    creating a set of geographic codes based on the geographic code associated with each item and the number of items associate with each geographic code;
    removing from the set of geographic codes any geographic code scheduled for non-delivery based on the desired delivery sequence;
    allocating an optimum number of pockets for sorting the items into a delivery sequence based on the set of geographic codes; and
    creating the delivery sequence sort plan based on the pocket allocation.

18. A computer program product comprising:
    a computer usable medium having computer readable instructions embodied therein for enabling creation of a delivery sequence sort plan for sorting items for delivery, the computer usable medium causing a processor to execute instructions, the instructions comprising:
        receiving information for sorting the items, the items being received at a receiving location, the information including a geographic code associated with each item and a numeric value indicating a number of items associated with each geographic code;
        accessing a desired delivery sequence for delivery points on a route, the desired delivery sequence being associated with each geographic code;
        identifying at least one delivery point on the route which did not receive an item for delivery; and
        generating the delivery sequence sort plan based on the desired delivery sequence and the number of items associated with each geographic code,
        wherein the delivery sequence sort plan does not allocate a sort resource for the delivery points on the route which did not receive an item for delivery at the receiving location.

19. The computer program product of claim 18, wherein generating the delivery sequence sort plan comprises:
    creating a set of geographic codes based on the geographic code associated with each item and the number of items associated with each geographic code;
    removing from the set of geographic codes any geographic code scheduled for non-delivery based on the desired delivery sequence;
    allocating an optimum number of pockets for sorting the items into a delivery sequence based on the set of geographic codes; and
    creating the delivery sequence sort plan based on the pocket allocation.

20. A method for sorting items for delivery, the method comprising:
    collecting geographic codes associated with items for delivery;
    computing a number of items associated with one or more geographic codes;
    accessing a desired delivery sequence for delivery points on a route, the desired delivery sequence being associated with the one or more geographic codes;
    identifying at least one delivery point on the route which did not receive an item for delivery;
    generating a delivery sequence sort plan based on the desired delivery sequence and the number of items associated with the one or more geographic codes; and
    sorting the items according to the delivery sequence sort plan,
    wherein the delivery sequence sort plan does not allocate a sort resource for the delivery points that are not receiving the items for delivery.

* * * * *

UNITED STATES PATENT AND TRADEMARK OFFICE
CERTIFICATE OF CORRECTION

PATENT NO. : 7,518,080 B2 Page 1 of 1
APPLICATION NO. : 10/450465
DATED : April 14, 2009
INVENTOR(S) : Michael J. Amato It is certified that error appears in the above-identified patent and that said Letters Patent is hereby corrected as shown below:

Claim 13, column 8, line 65, "codes;" should read --code;--.

Claim 15, column 9, line 36, "codes," should read --code,--.

Claim 16, column 9, line 58, "codes," should read --code,--.

Signed and Sealed this

Second Day of June, 2009

JOHN DOLL
*Acting Director of the United States Patent and Trademark Office*